(12) United States Patent
Davidson

(10) Patent No.: US 8,668,074 B2
(45) Date of Patent: Mar. 11, 2014

(54) METHOD FOR TRANSFERRING AN ARTICLE

(75) Inventor: Hartmut Davidson, Nittendorf (DE)

(73) Assignee: Krones AG, Neutraubling (DE)

( * ) Notice: Subject to any disclaimer, the term of this patent is extended or adjusted under 35 U.S.C. 154(b) by 138 days.

(21) Appl. No.: 13/376,870

(22) PCT Filed: Mar. 24, 2011

(86) PCT No.: PCT/EP2011/001486
§ 371 (c)(1),
(2), (4) Date: Dec. 8, 2011

(87) PCT Pub. No.: WO2011/134576
PCT Pub. Date: Nov. 3, 2011

(65) Prior Publication Data
US 2012/0085619 A1    Apr. 12, 2012

(30) Foreign Application Priority Data
Apr. 29, 2010   (DE) .......................... 10 2010 028 383

(51) Int. Cl.
*B65G 47/34*   (2006.01)
*B65G 47/84*   (2006.01)
*B65G 43/10*   (2006.01)

(52) U.S. Cl.
CPC .............. *B65G 47/846* (2013.01); *B65G 43/10* (2013.01)
USPC ....................................... 198/478.1; 198/575

(58) Field of Classification Search
CPC ...... B65G 47/846; B65G 43/10; B65G 29/00; B65G 47/847; B65G 37/02; B65G 43/08; B65G 47/31; B65G 47/261; B65H 2220/02; B65H 2220/01

USPC ............ 198/469.1, 470.1, 476.1, 478.1, 575, 198/471.1

See application file for complete search history.

(56) References Cited

U.S. PATENT DOCUMENTS

| | | | |
|---|---|---|---|
| 1,604,440 A | | 10/1926 | Wilkinson |
| 4,726,876 A | * | 2/1988 | Tomsovic, Jr. ............. 198/459.8 |
| 4,891,568 A | * | 1/1990 | Shibata et al. ................ 198/577 |
| 6,264,457 B1 | * | 7/2001 | Ohmes et al. ................ 198/571 |
| 6,557,695 B2 | * | 5/2003 | Gerber et al. ............. 198/473.1 |
| 6,820,671 B2 | * | 11/2004 | Calvert ...................... 198/471.1 |
| 6,942,086 B2 | * | 9/2005 | Bridges et al. ............ 198/471.1 |
| 7,712,601 B2 | * | 5/2010 | Shimomura .................. 198/571 |
| 2002/0063037 A1 | | 5/2002 | Bruun et al. |
| 2004/0134754 A1 | | 7/2004 | Grafer et al. |

FOREIGN PATENT DOCUMENTS

| DE | 10257466 A1 | 7/2004 |
|---|---|---|
| DE | 29724903 U1 | 10/2005 |

OTHER PUBLICATIONS

International Search Report for PCT/EP2011/001486 dated Jun. 21, 2011.

\* cited by examiner

*Primary Examiner* — James R Bidwell
(74) *Attorney, Agent, or Firm* — Marshall, Gerstein & Borun LLP

(57) ABSTRACT

A method for transferring an article from a first conveying device to a second conveying device, where at least one conveying device comprises at least one motor, including determining a load of the at least one motor, and adjusting the relative positioning of the first conveying device with respect to the second conveying device depending on the determined load.

12 Claims, 3 Drawing Sheets

METHOD FOR TRANSFERRING AN ARTICLE

CROSS-REFERENCE TO RELATED APPLICATION

The present application claims the benefit of priority of International Patent Application No. PCT/EP2011/001486, filed Mar. 24, 2011, which application claims priority of German Application No. 102010028383.5, filed Apr. 29, 2010. The entire text of the priority application is incorporated herein by reference in its entirety.

FIELD OF THE DISCLOSURE

The present disclosure relates to a method for transferring an article from a first conveying device to a second conveying device, wherein at least one conveying device includes at least one motor.

BACKGROUND

Particularly in the beverage industry it is often necessary to transfer articles, e.g. bottles, from one treatment unit to a second treatment unit. These transfers can, for example, happen using one or more transport star wheels.

In the process, the transfers have to be adjusted as exactly as possible, as otherwise the articles may get jammed in the region of transfer and thereby a high force acts on the articles or the transport runs unevenly or clamps and guides of conveying devices used for the transfer suffer from strong abrasion.

Usually the adjustment of the transfer is performed optically, i.e. the relative positioning or arrangement of the conveying devices used for the transfer is carried out by an operator during a downtime of the machine.

This procedure, however, has the disadvantage that it is very time consuming and does not always lead to satisfactory results. Furthermore, in the production process other dynamic circumstances are present, which may lead to imprecise transfers. The transfers may also change during the production process due to wear.

SUMMARY OF THE DISCLOSURE

It is therefore one aspect of the present disclosure to provide a method which allows for an improved adjustment of a transfer of an article from a first conveying device to a second conveying device.

The method according to the disclosure for transferring an article from a first conveying device to a second conveying device, wherein at least one conveying device includes at least one motor, includes the steps of: determining a load of the at least one motor and adjusting the relative positioning of the first conveying device with respect to the second conveying device depending on the determined load.

The present disclosure uses the finding that the load of a motor of a conveying device changes depending on the relative positioning of the conveying devices, i.e. depending on the adjustment of the transfer. By adjusting the relative positioning of the conveying devices with respect to each other depending on a determined load, the present method allows for a more precise adjustment of the transfer of an article from a first conveying device to a second conveying device.

The article to be transferred may particularly be a container, for example, a bottle or a can.

The first and/or second conveying device or transfer device may each be an infeed star wheel, a discharge star wheel or a transfer star wheel, particularly of a filling facility in the beverage industry. For instance, the first conveying device may be a transfer star wheel between two treatment units of an article and the second conveying device may be an infeed or discharge star wheel of one of the treatment units.

The first and/or second conveying device can, however, also comprise several conveying elements, for example, several transport star wheels. For instance, the first and/or second conveying device may comprise a carousel and/or a discharge star wheel and/or an infeed star wheel. In this case, the adjustment of the relative positioning may comprise an adjustment or change of the relative position of at least one conveying element of the first and/or second conveying device or may correspond to an adjustment or change of the relative position of at least one conveying element of the first and/or second conveying device.

In particular, each conveying element of the first and/or second conveying device may comprise an own motor, particularly a servomotor.

The first and/or second conveying device may comprise holding elements, particularly grippers or clamps, for holding the articles to be transferred. The transfer of an article from a first conveying device to a second conveying device may thereby comprise loosening of a holding element of the first conveying device and closing a holding element of the second conveying device. During the transfer, the article may temporarily also be held or fixed by a holding element of the first conveying device and by a holding element of the second conveying device.

The at least one motor may be a position-controlled motor. The at least one motor may particularly be a servo drive or servomotor. A servo drive is understood as an electronically controlled electric motor with position, speed and/or momentum control.

Determining the load may comprise determining an angular momentum of the at least one motor. Particularly if the at least one motor is a servo motor, the angular momentum can be determined very precisely.

The first conveying device as well as the second conveying device may each comprise at least one motor. In this case, determining the load may comprise determining the load, particularly determining an angular momentum, of the at least one motor of the first conveying device and determining the load, particularly determining an angular momentum, of the at least one motor of the second conveying device. Determining the load may also comprise determining a total load, particularly determining a total angular momentum, of a plurality or all motors of the first and the second conveying device. The total angular momentum can then correspond to the sum of the angular momentum of the at least one motor of the first conveying device and the angular momentum of the at least one motor of the second conveying device.

Adjusting the relative positioning may comprise minimizing the load of the at least one motor. In particular, adjusting the relative positioning may comprise minimizing the angular momentum. According to the disclosure, it is thereby taken advantage of the fact that a poorly adjusted transfer leads to an increase of the angular momentum. Minimizing the load, particularly the angular momentum, of the at least one motor, thus, may lead to a better adjusted transfer.

In particular, adjusting the relative positioning may comprise a further determination of a load, particularly of an angular momentum, of the at least one motor. Adjusting the relative positioning may comprise altering the positioning of the first and/or second conveying device. By repeatedly altering the positioning in combination with determining the load or the angular momentum, a minimum of the load can be determined. The minimum determined by the adjustment can particularly correspond to a local minimum.

Adjusting the positioning of the first and/or second conveying device may comprise changing the position of the first and/or second conveying device. In particular, the change of the position may be smaller than a pitch section (a pitch), particularly smaller than 1% of a pitch section (a pitch).

By adjusting the positioning a transfer position or transfer point can be adjusted.

Adjusting the relative positioning may be performed partially or completely automatic. The adjustment can, for example, happen via an automatic control loop or via an operator, to whom the determined load is displayed on a display device.

Prior to the step of determining a load, the relative positioning of the first conveying device with respect to the second conveying device can be adjusted by an operator. This adjustment step can be a rough visual adjustment. Adjusting the relative positioning depending on the determined load may then correspond to a fine tuning of the relative positioning.

The step of determining a load can be performed continuously or at predetermined time intervals. The method, thus, may include monitoring the load of the at least one motor.

The step of adjusting the relative positioning depending on the determined load can be performed at predetermined time intervals or in response to a change of the load of the at least one motor, in particular, in response to an increase of the load of the at least one motor. In this way, it is possible to ensure an optimized adjustment of the transfer during operation.

Particularly, the step of adjusting can be performed in this case when an increase of the load is determined, in particular, an increase of the load by a predetermined amount or fraction, for example, of 2% to 8%, particularly of 5%.

The method may further include storing adjusted parameter values of the first and/or second conveying device, which have been obtained by adjusting the relative positioning. In other words, a transfer of an article from a first conveying device to a second conveying device can be optimized by an above described method and the optimized parameter values, which characterize the relative positioning of the first conveying device with respect to the second conveying device, may be stored thereafter, for example, in a parameter table. These parameters may then be used during the current production. In other words, the positioning of the conveying devices during production can be set to the stored parameter values.

The disclosure further provides a computer program product comprising one or more computer readable media with computer executable instructions for performing the steps of an above described method, when these instructions are executed on a computer.

The disclosure further provides a device for transferring an article from a first conveying device to a second conveying device, including a first and a second conveying device, wherein at least one conveying device includes at least one motor, and a control element, which is designed such that it can perform an adjustment of the relative positioning of the first conveying device with respect to the second conveying device depending on a determined load of the at least one motor.

In other words, the device, particularly the control element, may be designed and/or configured such that it can perform one of the above described methods.

The control element may particularly be configured such that it performs a self-adapting control, which controls the adjustment of the relative positioning of the first conveying device with respect to the second conveying device depending on the determined load in such a way that the load, particularly the angular momentum, of the at least one motor is minimized or kept at a minimum.

The at least one motor may be a servo motor.

The motor, the first conveying device and/or the second conveying device may exhibit one or more of the above described features.

The disclosure further provides a system, particularly a filling facility for the beverage industry, comprising at least two treatment devices for treating an article and at least one above described device.

The two treatment devices may be, for example, a filling machine, a labeling device, a rinser, a blow molding machine or a packing machine.

The first conveying device may particularly be part of a first treatment device. The second conveying device may be a transfer element or an element of a second treatment device.

BRIEF DESCRIPTION OF THE DRAWINGS

Further features and advantages will be described hereinafter with reference to the exemplary figures. It shows.

DETAILED DESCRIPTION OF THE PREFERRED EMBODIMENT

Figure 1:
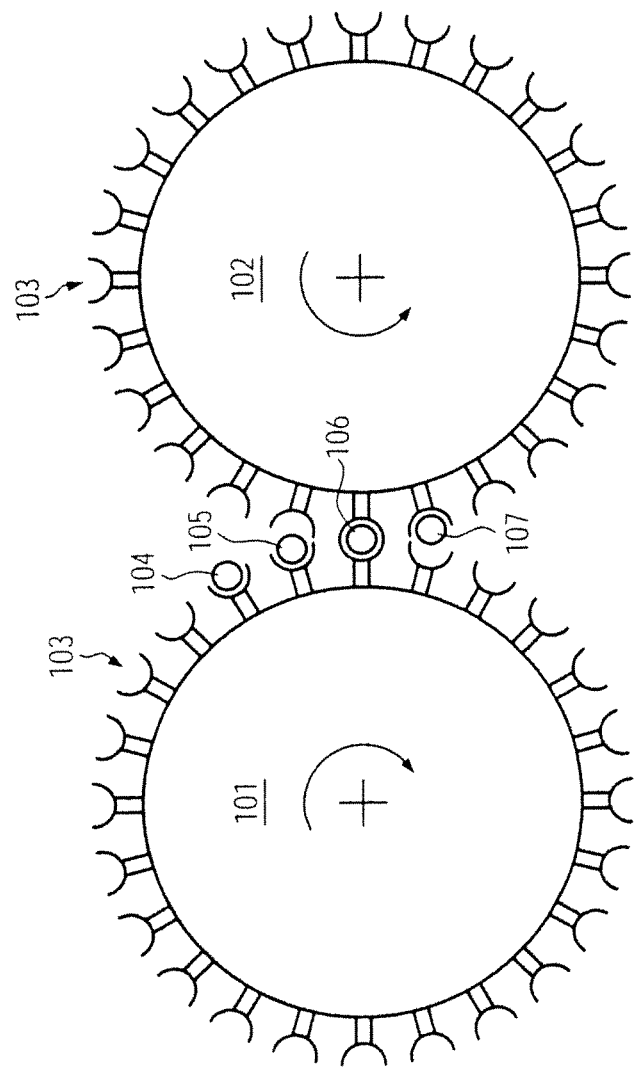
FIG. 1 an exemplary device for transferring an article from a first conveying device to a second conveying device.

FIG. 1 shows an exemplary device for transferring an article. In the following it is assumed that the article is a bottle, for example a glass or a plastic bottle. However, also arbitrary other types of containers, for example, cans, are possible.

FIG. 1 shows particularly a first conveying device 101 and a second conveying device 102. The first conveying device 101 can, for example, be a discharge star wheel of a first treatment device while the second conveying device 102 is an infeed star wheel of a second treatment device. The first conveying device or the second conveying device may also be a transfer star wheel.

The first conveying device 101 as well as the second conveying device 102 each comprises a plurality of clamps or grippers 103, which can fix or hold the bottles in the area of the bottle mouth and/or of the bottle body. The grippers 103 can, for example, be designed as passive (elastic) gripping pliers or as active (controllable) gripping pliers.

In this example, the first conveying device 101 moves clockwise while the second conveying device 102 performs a counter-clockwise rotation. The direction of rotation of the conveying devices is respectively indicated in FIG. 1 by an arrow. The rotational movement of the shown conveying devices is thereby driven by a servo motor in each case, which is connected to an axis of the respective conveying device.

In FIG. 1 several exemplary bottles 104, 105, 106 and 107 are shown. Bottles 104 and 105 are fixed by grippers 103 of the first conveying device 101 and moved along a circular path. Bottles 104 and 105, thus, are arranged ahead of the transfer to the second conveying device 102.

Exemplary bottle 106 is arranged in the area of transfer from the first conveying device 101 to the second conveying device 102. In this area, the gripper 103 of the first conveying device 101 loosens the fixing of the bottle mouth after a gripper 103 of the second conveying device 102 has fixed the bottle mouth. Due to the further rotational movement, the bottle then leaves the area of the gripper 103 of the first conveying device 101. Such an exemplary bottle after the transfer is shown in FIG. 1 as bottle 107.

Figure 2:
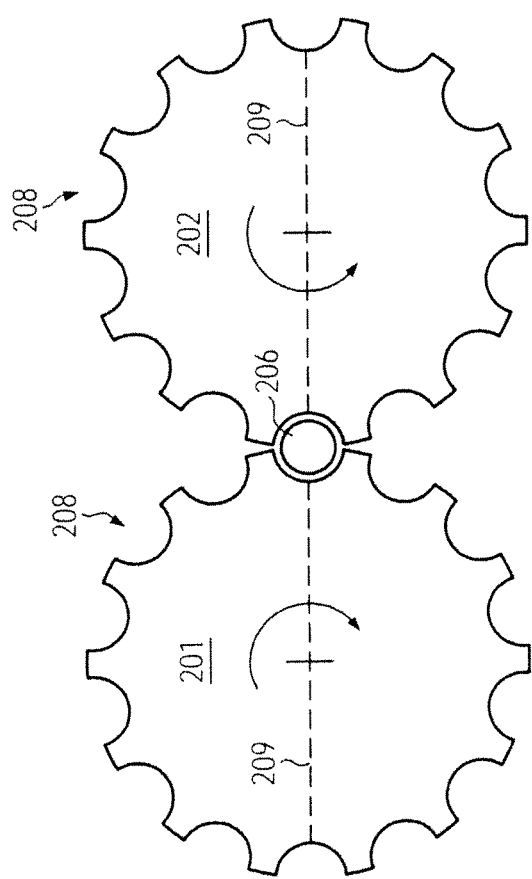
FIG. 2 a further exemplary device for transferring an article from a first conveying device to a second conveying device.

FIG. 2 shows a further exemplary device. In this device, recesses 208 in the first conveying device 201 and in the second conveying device 202, respectively, are shown instead of grippers. The first conveying device 201 again rotates clockwise while the second conveying device 202 rotates counter-clockwise. An exemplary article 206 is shown in the transfer area from the first conveying device 201 to the second conveying device 202.

The device in FIG. 1 as well as the exemplary device in FIG. 2 further comprises a control element (not shown). This control element is designed such that it determines a load, particularly an angular momentum, of at least one motor of the first conveying device or of the second conveying device, and controls an adjustment of the relative positioning of the first conveying device with respect to the second conveying device depending on the determined load.

In other words, the control element performs a control program which optimizes the transfer of articles from the first conveying device to the second conveying device. This control can particularly be a self-adapting control, which minimizes the angular momentum of the at least one motor or keeps it at a minimum.

For this purpose, parameter values, which determine the relative positioning of the first conveying device with respect to the second conveying device, are varied and a minimum value for the load, particularly for the angular momentum, is searched. In particular, the vertical and/or horizontal position of the first and/or second conveying device may be varied. The variations of the parameter values may thereby lie in a range of a tenth of a millimeter. Alternatively or in addition, an angle with respect to a predetermined axis, for example axis 209 in FIG. 2, may be varied. The variations of the angle can thereby be smaller than 1° (one degree), particularly smaller than 1' (one angular minute).

By such an adjusted transfer, the articles as well as the material of the conveying devices, for example, the clamps or grippers, may be preserved. Damages to the machines, which are caused by poorly adjusted transfers, can be effectively prevented or minimized in this way.

According to the disclosure, the finding is thereby used that a correlation exists between the relative positioning of the conveying devices and the load of at least one motor of one of the conveying devices.

If the transfer, particularly the transfer point, from one conveying device to the second conveying device is adjusted imprecisely, jams between the articles to be transferred and the holding elements used for the transfer, for example, clamps, can occur. Thereby, the angular momentum, which acts on the conveying devices, increases and, thus, the load of the motor, i.e. the angular momentum, that this one has to provide.

Figure 3:
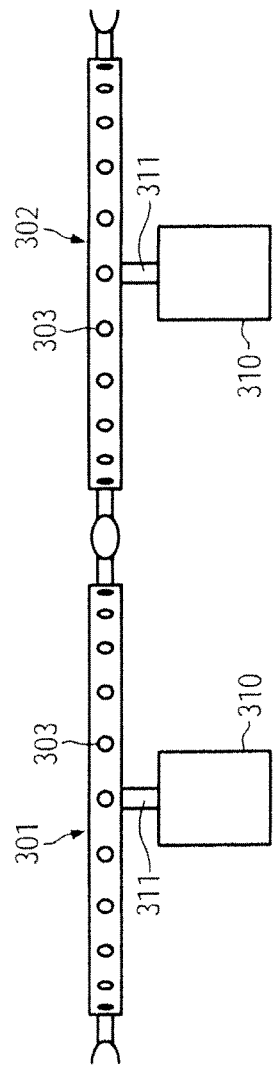
FIG. 3 a side view of an exemplary device for transferring an article from a first conveying device to a second conveying device.

FIG. 3 shows a side view of an exemplary device for transferring an article, for example, of the exemplary device of FIG. 1.

In particular, FIG. 3 shows a first conveying device 301 and a second conveying device 302, which each comprises several clamps or grippers 303. Via a shaft 311 a servo drive 310 acts on the central axis of each conveying device. In this way, the conveying devices can be rotated. Servomotors can determine the necessary angular momentum very precisely. A degradation of the transfer, for example due to a jam of the articles, leads to an increase of the necessary angular momentum. By adjusting the relative positioning of the conveying devices with respect to each other, particularly by minimizing the necessary angular momentum, the transfer can be optimized.

The optimization can thereby be performed once in the form of an optimization run, and the determined parameters can in this case be transferred to a parameter table. Alternatively or in addition, the control can also run continuously in the background during the production and in this way take care that the angular momentum is kept at a minimum.

Although in the above described examples the conveying devices each comprise only one conveying element, particularly one transport star wheel, each of the conveying devices can also comprise several conveying elements, particularly several transport star wheels.

In this case, each conveying element may comprise a motor, in particular, a servo motor. Then, the load of one or more motors of the first and/or second conveying device may be determined or a total load of several, particularly all, motors of the first and/or second conveying device. Based on the determined load or total load, particularly angular momentum or total angular momentum, then the relative position of at least one conveying element of the first and/or second conveying device may be adjusted, particularly such that the angular momentum or the total angular momentum of one or more motors of the first and/or second conveying device is minimized.

It goes without saying that features mentioned in the embodiments described before are not restricted to these specific combinations and are also possible in arbitrary other combinations. In particular, also other embodiments of the conveying devices, particularly all form-fit transfers, are conceivable.

The invention claimed is:

1. Method for transferring an article from a first conveying device to a second conveying device, wherein at least one conveying device comprises at least one motor, comprising:
   determining a load of the at least one motor; and
   adjusting the relative positioning of the first conveying device with respect to the second conveying device depending on the determined load, such that a transfer point is adjusted.

2. The method according to claim 1, wherein determining the load comprises determining an angular momentum of the at least one motor.

3. The method according to claim 1, wherein adjusting the relative positioning comprises minimizing the load of the at least one motor.

4. The method according to claim 1, wherein the adjustment is performed partially or completely automatic.

5. The method according to claim 1, wherein the step of determining a load is performed continuously or at predetermined time intervals.

6. The method according to claim 5, wherein the step of adjusting is only performed when an increase of the load compared to a previously determined load is determined.

7. The method according to claim 1, and further comprising storing adjusted parameter values of one of the first conveying device the second conveying device, and a combination thereof, which parameter values have been obtained by adjusting the relative positioning.

8. A computer program product comprising one or more computer readable media with computer executable instructions for performing the method according to claim 1, when these instructions are executed on a computer.

9. Device for transferring an article from a first conveying device to a second conveying device, comprising:
- a first and a second conveying device, wherein at least one conveying device comprises at least one motor, and
- a control element, which is designed such that it can perform an adjustment of the relative positioning of the first conveying device with respect to the second conveying device depending on a determined load of the at least one motor, such that a transfer point is adjusted.

10. The device according to claim 9, wherein the at least one motor is a servomotor.

11. A system comprising at least two treatment devices for treating an article and at least one device according to claim 9.

12. The system according to claim 11, comprising a portion of a filling facility for filling beverages in containers.

* * * * *